(12) United States Patent
Chen

(10) Patent No.: US 6,267,405 B1
(45) Date of Patent: Jul. 31, 2001

(54) FOLDABLE STROLLER

(76) Inventor: Chin-Chiao Chen, No. 1146, Chung-Shan Rd. Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/575,797

(22) Filed: May 22, 2000

(51) Int. Cl.[7] .................................................. B62B 3/02
(52) U.S. Cl. ........................ 280/647; 280/650; 280/658
(58) Field of Search .................................. 280/647, 650, 280/658, 642, 649, 655, 657, 47.34

(56) References Cited

U.S. PATENT DOCUMENTS

| | | | |
|---|---|---|---|
| 4,725,071 | * | 2/1988 | Shamie ................................ 280/643 |
| 5,257,799 | * | 11/1993 | Cone et al. ......................... 280/642 |
| 5,460,398 | * | 10/1995 | Huang ................................. 280/642 |
| 5,865,460 | * | 2/1999 | Huang ................................. 280/642 |
| 5,876,057 | * | 3/1999 | Huang ................................. 280/642 |
| 5,938,229 | * | 8/1999 | Chen et al. ......................... 280/642 |
| 6,062,587 | * | 5/2000 | Cabagnero .......................... 280/642 |
| 6,152,476 | * | 11/2000 | Huang ................................. 280/642 |
| 6,196,571 | * | 3/2001 | Chen et al. ......................... 280/647 |

* cited by examiner

Primary Examiner—Brian L. Johnson
Assistant Examiner—Tony Winner
(74) Attorney, Agent, or Firm—Foley & Lardner

(57) ABSTRACT

A foldable stroller includes a pair of rear legs, a pair of hollow handle tubes, a pair of front legs, a pair of bracing rods, a pair of locking members, a pair of plungers, a pair of actuating members, and a pair of biasing members. Each handle tube has a lower end with a forward enlarged portion. Each front leg has an upper end with a rearward enlarged portion. When the handle tubes are moved from a folded position to a stretched position, the forward enlarged portion moves from a first angular position where the forward enlarged portion overlaps slightly with the rearward enlarged portion, to a second angular position where the forward enlarged portion overlaps extensively with the rearward enlarged portion. Each locking member has a hooked portion disposed on the rearward enlarged portion and a rear hooking portion that is pivotally mounted on the forward enlarged portion, and that engages the hooked portion when the forward enlarged portion is in the second angular position. The handle tubes are operable to cause the rear hooking portion to disengage the hooked portion to allow folding of the foldable stroller.

7 Claims, 9 Drawing Sheets

US 6,267,405 B1

FOLDABLE STROLLER

BACKGROUND OF THE INVENTION

1. Field of the Invention

The present invention relates to a foldable stroller, more particularly to a foldable stroller that occupies a relatively small amount of space after folding to facilitate storage and transport thereof, and that is safe to use.

2. Description of the Related Art

Foldable strollers with three wheels are known in the art. FIG. 1 illustrates a conventional foldable stroller 10 which includes a front support frame 11 connected to a handle bar 12, a rear support frame 13, and a base frame 14. The base frame 14 has a front end provided with a front wheel 15, and a rear end provided with a spaced pair of rear wheels 15. The front support frame 11 is provided with a seat member 16 and a foldable canopy 17. The front end of the base frame 14 is formed with a positioning seat 18 which is provided with a spring-loaded positioning pin 19. The front support frame 11 is disposed above the base frame 14, and has a detachable front end connected releasably to the positioning seat 18. With reference to FIGS. 1 and 2, the detachable front end of the front support frame 11 is formed with an insert hole 111 to permit extension of the spring-loaded positioning pin 19 for locking the front end of the front support frame 11 detachably to the base frame 14. The rear support frame 13 has an upper end mounted pivotally to the front support frame 11, and a lower end mounted pivotally to the base frame 14.

Referring to FIGS. 2 and 3, to collapse the conventional stroller 10, the canopy 17 is first folded onto the front support frame 11. The spring-loaded positioning pin 19 is subsequently raised for removal from the insert hole 107 so as to release the front end of the front support frame 11 from the positioning seat 18. The upper end of the rear support frame 13 is then pivoted forwardly relative to the lower end thereof, and the front support frame 11 is pulled forwardly for folding onto the base frame 14. However, it is noted that the folded stroller 10 occupies a large amount of space since the folded stroller 10 still has a relatively long length. Moreover, since the front support frame 11 must be pulled forwardly for folding onto the base frame 14, the section of the front support frame 11 projecting forwardly from the front wheel 15 may create inconvenience during both storage and transport of the stroller 10.

SUMMARY OF THE INVENTION

Therefore, the object of the present invention is to provide a foldable stroller that occupies a relatively small amount of space after folding to facilitate storage and transport thereof.

Accordingly, the foldable stroller of the present invention includes a rear wheel axle, a pair of rear legs, a pair of hollow handle tubes, a front leg frame, a pair of bracing rods, a pair of locking members, a pair of plungers, a pair of actuating members, and a pair of biasing members. The rear wheel axle has two lateral ends that are provided with two rear wheels. The rear legs are disposed to be parallel to and spaced apart from each other in an axial direction that is parallel to the rear wheel axle. Each rear leg has a lower anchored leg end mounted on a respective one of the lateral ends of the rear wheel axle, and an upper anchored leg end extending upwardly from the lower anchored leg end. The hollow handle tubes are disposed to be parallel to and spaced apart from each other in the axial direction. Each hollow handle tube has a lower tubular end, an upper tubular end, and an intermediate tubular section therebetween. The lower tubular end has a forward enlarged portion with a forward wall extending in the axial direction, and a right lateral wall joining the forward wall and facing the axial direction. The intermediate tubular section is mounted pivotally to the upper anchored leg end of a respective one of the rear legs about the axial direction such that the upper tubular ends of the hollow handle tubes are foldable downwardly and forwardly onto the rear legs to place the hollow handle tubes in a first folded position, and are stretchable upwardly and rearwardly from the rear legs to place the hollow handle tubes in a first stretched position. The front leg frame includes a front wheel rod which is provided with a front wheel, and a pair of front legs. Each front leg has a lower leg end connected to the front wheel rod, an upper leg end, and an intermediate leg section between the upper and lower leg ends. When the front legs are in a second stretched position, the upper leg ends extend upwardly, rearwardly and in a first transverse direction relative to the axial direction from the lower leg ends. Each upper leg end has a rearward enlarged portion with a rearward wall and a right lateral section. The rearward wall extends in the axial direction, and confronts the forward wall of the lower tubular end of a respective one of the hollow handle tubes in the first transverse direction. The right lateral section joins the rearward wall and faces the axial direction, and is pivotally mounted to the right lateral wall of the lower tubular end of a respective one of the hollow handle tubes at a first pivot point about the axial direction such that when the hollow handle tubes are moved from the first folded position to the first stretched position, the right lateral wall moves from a first angular position where the right lateral wall overlaps slightly with the right lateral section, to a second angular position where the right lateral wall overlaps extensively with the right lateral section. Each bracing rod has a rear end and a front end. The rear end is mounted pivotally to the respective rear leg and proximate to the lower anchored leg end about the axial direction. The front end is mounted pivotally to the intermediate leg section of a respective one of the front legs about the axial direction such that when the front legs are in a second folded position, the lower leg ends of the front legs will be turned about the axial direction and towards the bracing rods so as to be brought closer thereto for collapsing. Each locking member includes a front hooked portion and a rear hooking portion. The front hooked portion is disposed on the right lateral section of the upper leg end of a respective one of the front legs, and extends in the axial direction. The rear hooking portion has a hooking end, and is pivotally mounted on the right lateral wall of the lower tubular end of a respective one of the hollow handle tubes at a second pivot point about the axial direction such that when the right lateral wall is in the second angular position and the rear hooking portion is actuated to turn about the axial direction, the hooking end is brought to engage the front hooked portion. The plungers are disposed in the intermediate tubular sections and extend into the upper tubular ends of the hollow handle tubes, respectively. Each plunger is movable in the first transverse direction, and has an actuated end and a coupling end opposite to each other in the first transverse direction. The coupling end is moved towards the forward enlarged portion so as to push the rear hooking portion of a respective one of the locking members to turn about the axial direction. The actuating members are disposed on and are movable relative to the upper tubular ends of the hollow handle tubes in the first transverse direction so as to actuate the actuated ends of the plungers. The biasing members are disposed to bias the coupling ends of the plungers to move in the first transverse direction and towards the upper tubular ends of the hollow handle tubes.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
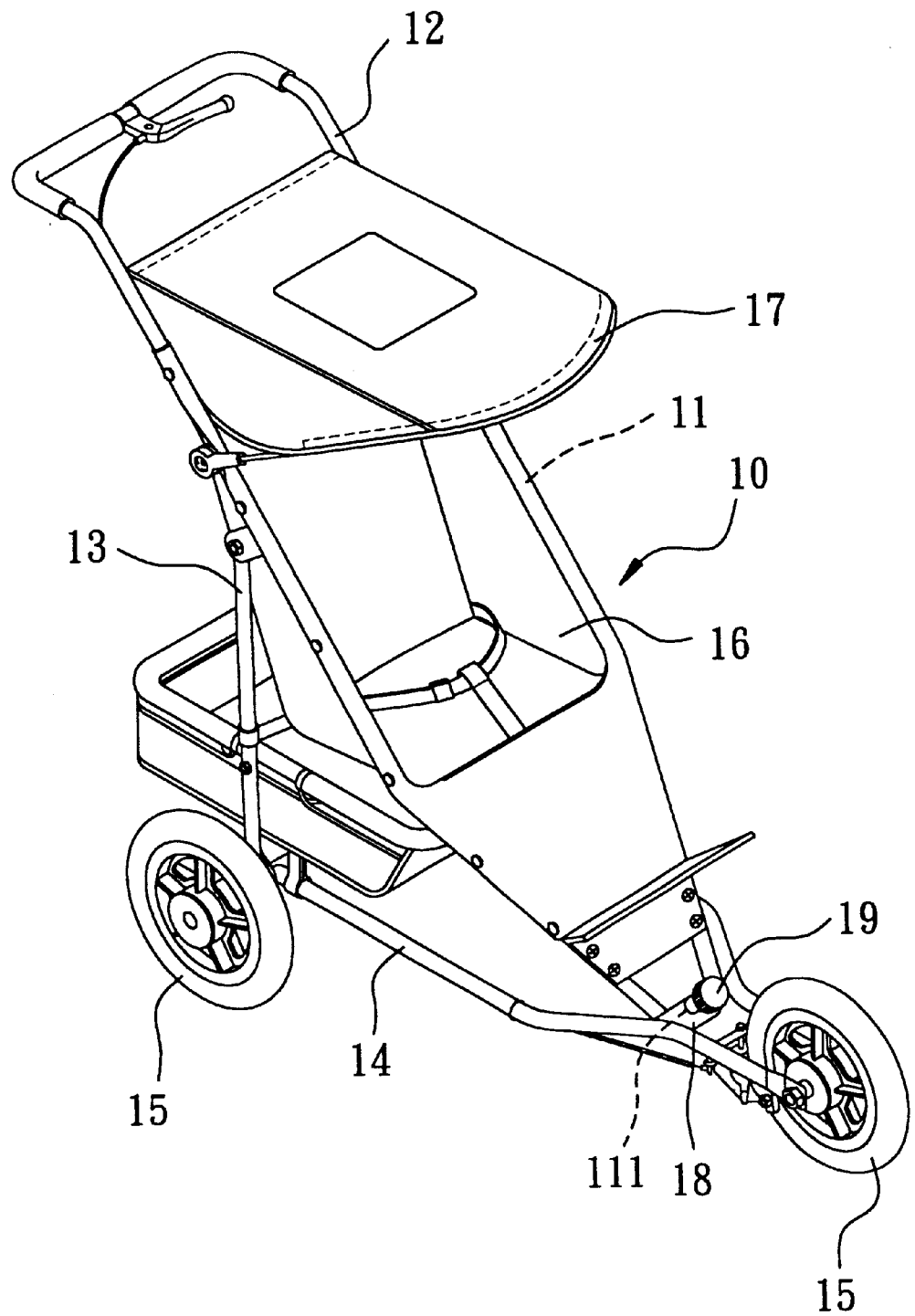
FIG. 1 is a perspective view of a conventional foldable stroller.
Figure 2:
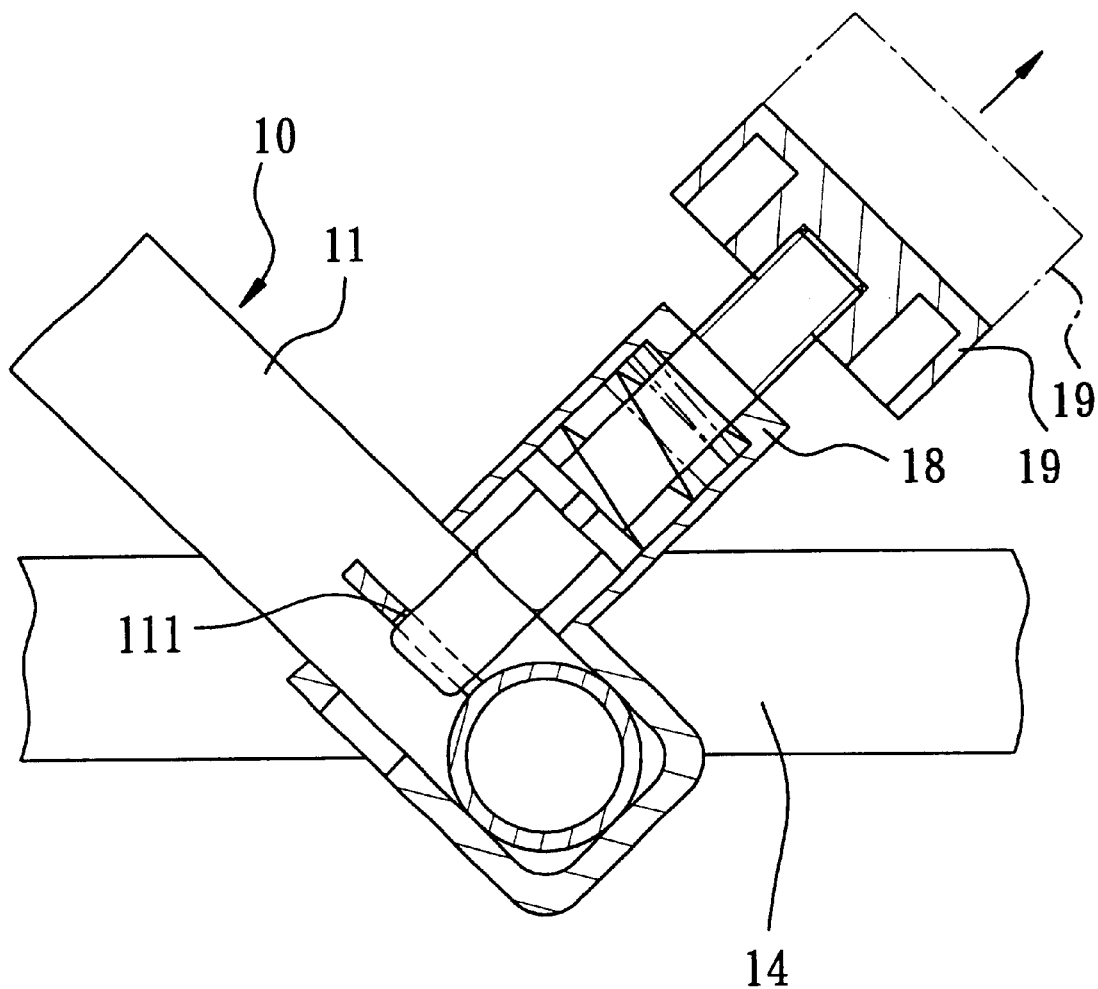
FIG. 2 is a fragmentary partly sectional view of the conventional foldable stroller.
Figure 3:
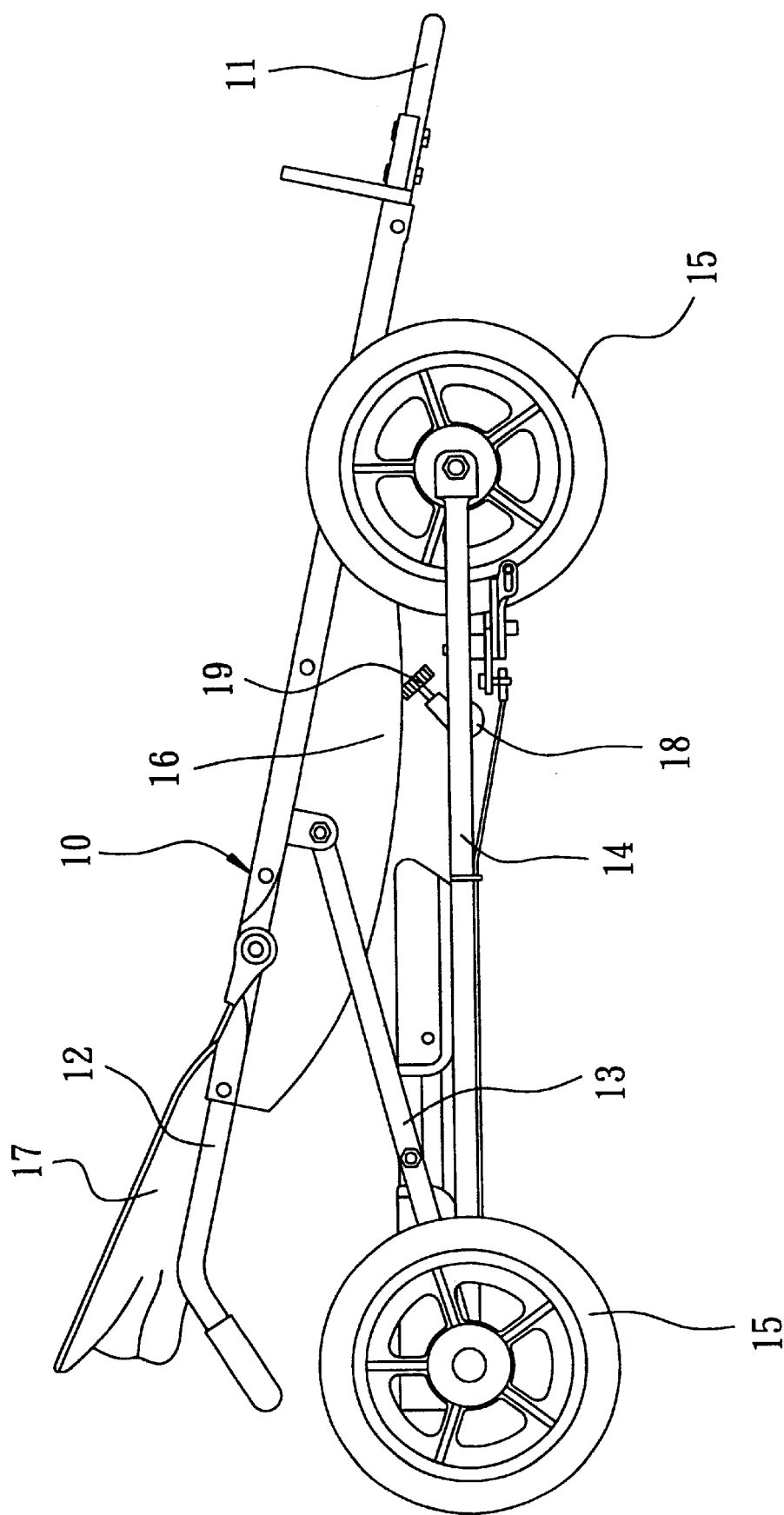
FIG. 3 is a side view illustrating the conventional foldable stroller in a folded state.
Figure 4:
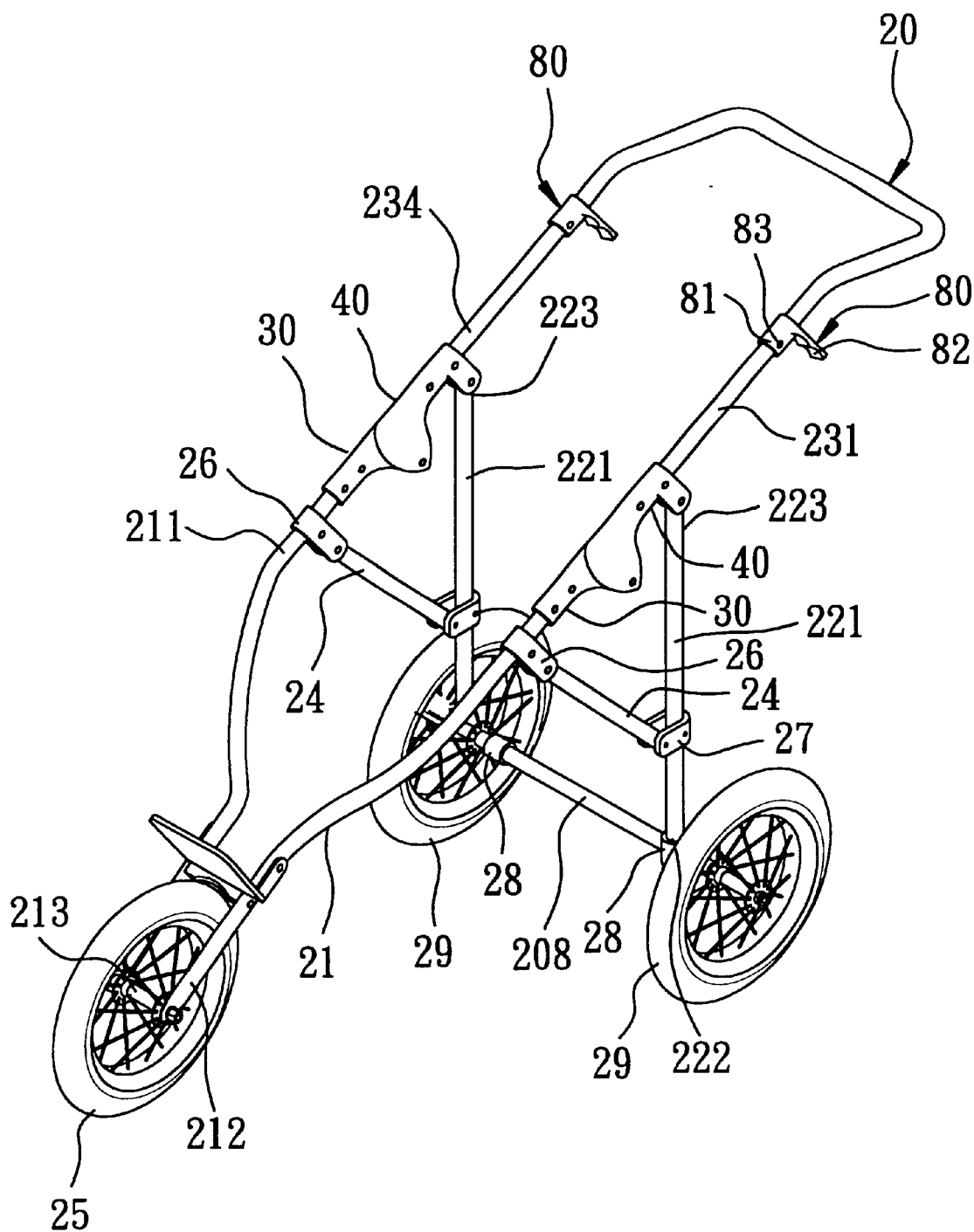
FIG. 4 is a perspective view of a preferred embodiment of a foldable stroller according to the present invention.
Figure 5:
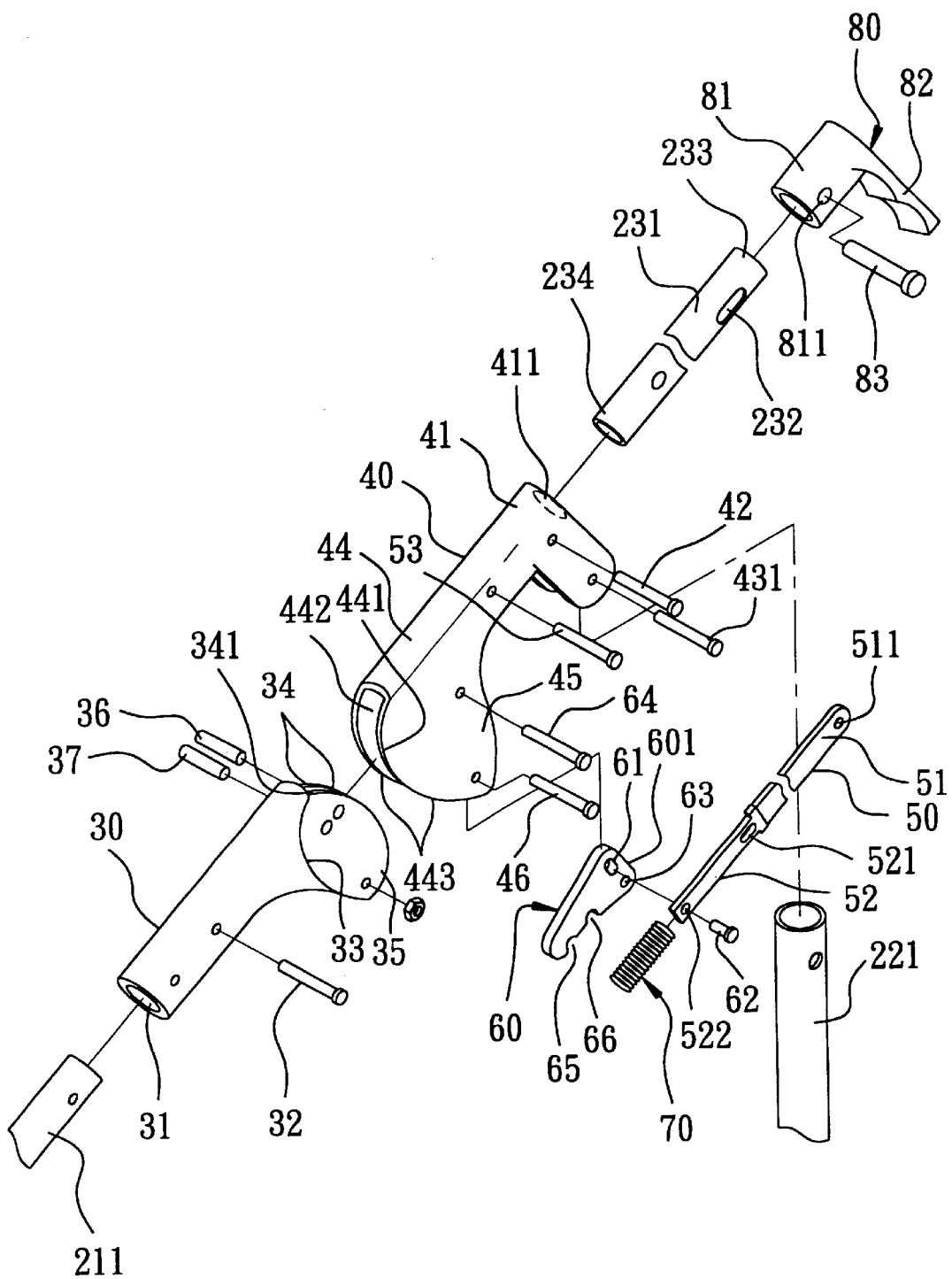
FIG. 5 is an exploded view showing a portion of the foldable stroller of the preferred embodiment.

Referring to FIGS. 4 and 5, the preferred embodiment of a foldable stroller 20 according to the present invention is shown to include a rear wheel axle 208, a pair of rear legs 221, a pair of hollow handle tubes 231, a front leg frame, a pair of bracing rods 24, a pair of locking members, a pair of plungers 50, a pair of actuating members 80, and a pair of biasing members 70.

The rear wheel axle 208 has two lateral ends 28 which are provided with two rear wheels 29. The rear legs 221 are disposed to be parallel to and spaced apart from each other in an axial direction that is parallel to the rear wheel axle 208. Each rear leg 221 has a lower anchored leg end 222 mounted on the respective lateral end 28 of the rear wheel axle 208, and an upper anchored leg end 223 extending upwardly from the lower anchored leg end 222.

The hollow handle tubes 231 are disposed to be parallel to and spaced apart from each other in the axial direction. Each hollow handle tube 231 has a lower tubular end 40, an upper tubular end 233, and an intermediate tubular section 234 disposed therebetween. The lower tubular end 40 has a forward enlarged portion 44 with a forward wall 441 extending in the axial direction, and a right lateral wall 45 joining the forward wall 44 and facing the axial direction. The upper tubular end 233 has a key slot 232 extending in a first transverse direction relative to the axial direction. The intermediate tubular section 234 is mounted pivotally to the upper anchored leg end 223 of the respective rear leg 221 by means of a pivot pin 431 about the axial direction such that the upper tubular end 233 is foldable downwardly and forwardly onto the respective rear leg 221 to place the hollow handle tube 231 in a first folded position, and is stretchable upwardly and rearwardly from the respective rear leg 221 to place the hollow handle tube 231 in a first stretched position. The lower tubular end 40 may be formed with an insert hole 411 extending in the first transverse direction, and one end of the intermediate tubular section 234 maybe inserted into the insert hole 411 and locked therein through the use of a locking element 42.

The front leg frame includes a front wheel rod 213 which is provided with a front wheel 25, and a pair of front legs 21. Each front leg 21 has a lower leg end 212, an upper leg end 30, and an intermediate leg section 212 therebetween. The lower leg end 212 is connected to the front wheel rod 213. When the front legs 21 are in a second stretched position, the upper leg ends 30 thereof extend upwardly, rearwardly and in the first transverse direction from the lowerleg ends 212. Each upper leg end 30 has a rearward enlarged portion 33 which is provided with a rearward wall 341 and a right lateral section 35. The rearward wall 341 extends in the axial direction and confronts the forward wall 441 of the forward enlarged portion 44 of the lower tubular end 40 of a respective one of the hollow handle tubes 231 in the first transverse direction. The right lateral section 35 joins the rearward wall 341 and faces the axial direction, and is pivotally mounted to the right lateral wall 45 of the forward enlarged portion 44 at a pivot pin 46 about the axial direction. As such, when the hollow handle tubes 231 are moved from the first folded position to the first stretched position, the right lateral wall 45 moves from a first angular position where the right lateral wall 45 overlaps slightly with the right lateral section 35, to a second angular position where the right lateral wall 45 overlaps extensively with the right lateral section 35. The upper leg end 30 may be formed with an insert hole 31 extending in the first transverse direction, and one end of the respective intermediate leg section 211 may be inserted into the insert hole 31 and locked therein through the use of locking elements 32.

In addition, with reference to FIG. 5, the forward enlarged portion 44 of the lower tubular end 40 of each of the hollow handle tubes 231 has a left lateral wall 45 opposite to the right lateral wall 45 in the axial direction. The right and left lateral walls 45 form right and left sweeping lug portions 443 that are spaced apart from each other in the axial direction to define an accommodating space 442 which extends in the first transverse direction to be communicated with the forward wall 441. The rearward enlarged portion 33 of the upper leg end 30 of each of the front legs 21 has a left lateral section 35 opposite to the right lateral section 35 in the axial direction. The right and left lateral sections 35 form right and left swept lug portions 34 that are spaced apart from each other in the axial direction, and that are respectively disposed inboard to the right and left sweeping lug portions 443 when the right and left sweeping lug portions 443 are in the second angular position.

Each bracing rod 24 has a rear end 27 and a front end 26. The rear end 27 is mounted pivotally to the respective rear leg 221 and proximate to the lower anchored leg end 222 about the axial direction. The front end 26 is mounted pivotally to the intermediate leg section 211 of the respective front leg 21 about the axial direction such that when the front legs 21 are in a second folded position, the lower leg ends 212 of the front legs 21 will be turned about the axial direction and towards the bracing rods 24 so as to be brought closer thereto for collapsing.

Figure 7:
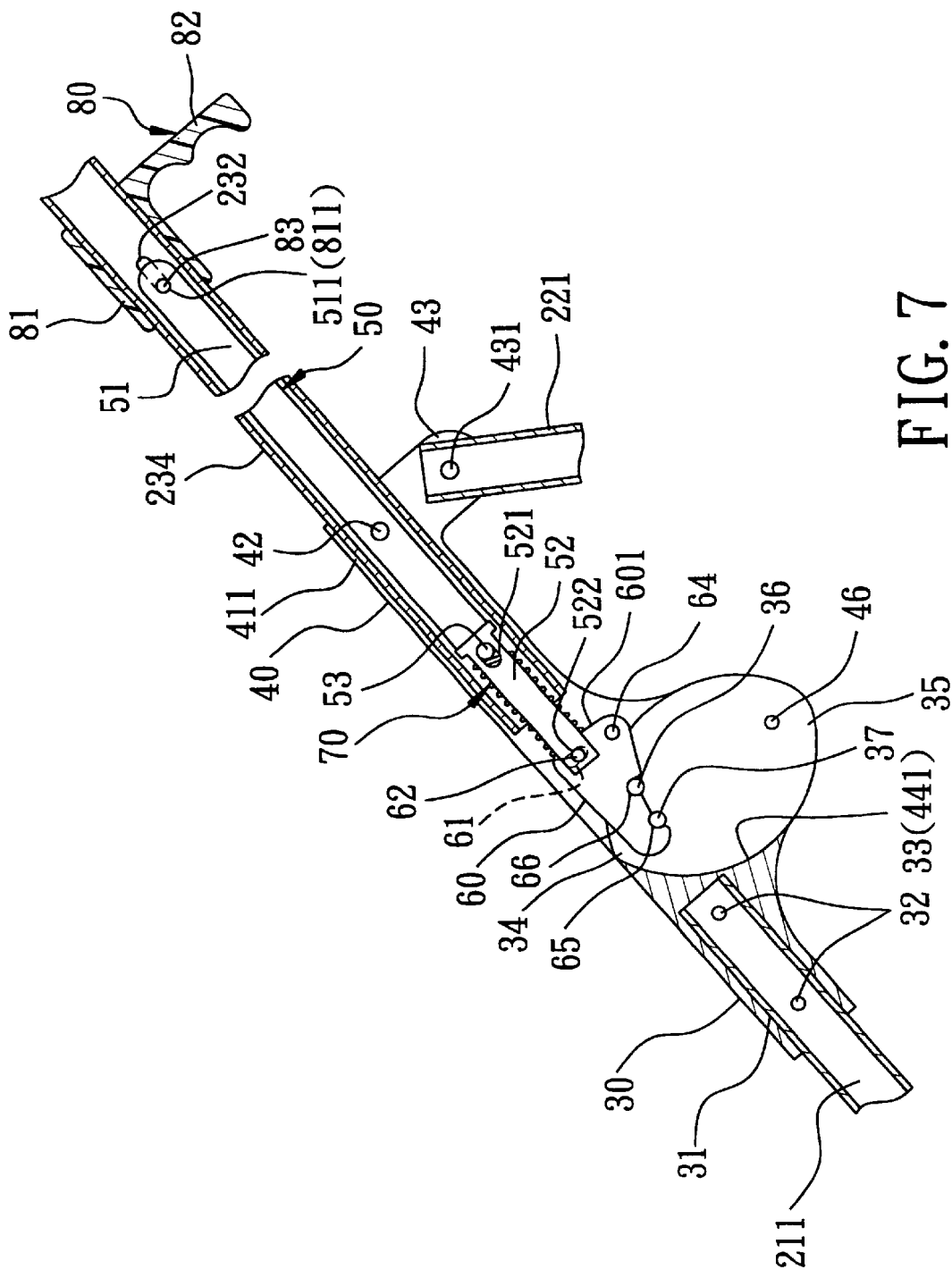
FIG. 7 is a fragmentary partly sectional view of the foldable stroller of the preferred embodiment in the unfolded state.
Figure 8:
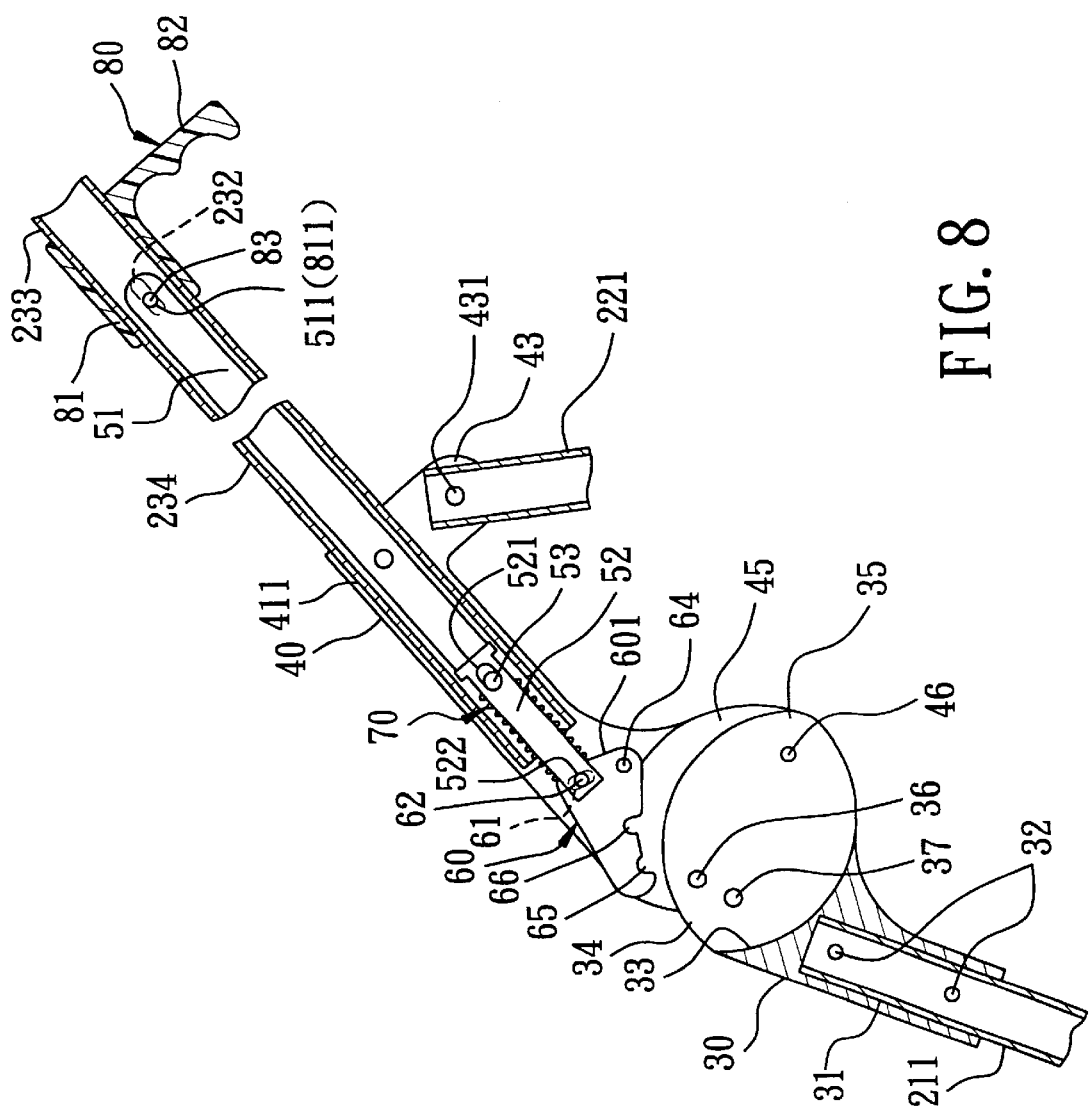
FIG. 8 is a fragmentary partly sectional view of the foldable stroller of the preferred embodiment in a folding state.

Each locking member includes a front hooked portion disposed on the right lateral section 35 of the upper leg end 30 of a respective one of the front legs 21 and extending in the axial direction, and a rear hooking portion 60 having a hooking end and a pivot pin hole 63 such that the rear hooking portion 60 is pivotally mounted on the right lateral wall 45 of the lower tubular end 40 of a respective one of the hollow handle tubes 231 at a pivot pin 64 passing through the pivot pin hole 63 about the axial direction. As such, when the right lateral wall 45 is in the second angular position and the rear hooking portion 60 is actuated to turn about the axial direction, the hooking end is brought to engage the front hooked portion. Referring to FIGS. 5, 7 and 8, the hooking end of the rear hooking portion 60 has proximate and distal hooking notches 65, 66 disposed relative to the pivot pin 64. The front hooked portion includes a pair of hooked pins 36, 37 respectively extending in the axial direction and secured to and disposed between the right and left swept lug portions 34 of the right lateral section 35, respectively. As such, when the right and left sweeping lug portions 443 are in the second angular position, the proximate and distal hooking notches 65, 66 engage the hooked pins 36, 37, respectively. Furthermore, the rear hooking portion 60 is generally triangular and includes an elongated slot 61 spaced apart from the pivot pin hole 63 for receiving a locking element 62.

The plungers 50 are disposed in the intermediate tubular sections 234 and extend into the upper tubular ends 233 of the hollow handle tubes 231, respectively. Each plunger 50 is movable in the first transverse direction, and has an actuated end 51 and a coupling end 52 opposite to each other in the first transverse direction. The coupling end 52 is moved towards the forward enlarged portion 44 of the respective hollow handle tube 231 so as to push the rear hooking portion 60 of a respective one of the locking members to turn about the axial direction. When the rear hooking portion 60 is pushed by the coupling end 52, the distal hooking notch 65 engages sequentially the two hooked pins 36, 37. In addition, the actuated end 51 is provided with a locking hole 511 corresponding to the key slot 232 of the upper tubular end 233. The coupling end 52 is provided with an elongated slot 521 at one end and proximate to the actuated end 51, and a locking hole 522 at the opposite end. A locking element 53 passes through the elongated slot 521 to secure the respective plunger 50 in the respective hollow handle tube 231, whereas the locking element 62 passes through the locking hole 522 and the elongated slot 61 of the rear hooking portion 60 to secure the coupling end 52 to the rear hooking portion 60.

The actuating members 80 are disposed on and movable relative to the upper tubular ends 233 of the hollow handle tubes 231 in the first transverse direction so as to actuate the actuated ends 51 of the plungers 50. Each actuating member 80 includes a tubular portion 81 with one end sleeved onto the upper tubular end 233 of a respective one of the hollow handle tubes 231, and a grip portion 82 extending downwardly from the other end of the tubular portion 81. The tubular portion 81 is formed with a locking hole 811 extending in the axial direction, and further includes a connecting key 83 disposed to extend in the axial direction and through the locking hole 811, the key slot 232, and the locking hole 511 of the actuated end 51 of the respective plunger 50 to interconnect the respective actuating member 80 and the actuated end 51 inside the upper tubular end 233 so as to transmit movement of the actuating members 80 relative to the upper tubular ends 233 of the hollow handle tubes 231 to the actuated ends 51 of the plungers 50. As such, when the actuating members 80 are caused to displace, the connecting key 83 may displace in the key slot 232 in the upper tubular end 233 of the respective hollow handle tube 231 to bring the actuated end 51 of the respective plunger 50 to displace synchronously therewith.

The biasing members 70 are disposed to bias the coupling ends 52 of the plungers 50 to move in the first transverse direction and towards the upper tubular ends 233 of the hollow handle tubes 231. In the preferred embodiment, the biasing members 70 are coil springs, each of which is sleeved on the respective plunger 50 and is disposed proximate to the coupling end 52.

The foldable stroller 20 of the present invention may further include a handle bar 23 which has two ends opposite to each other in the axial direction and respectively connected to the upper tubular ends 233 of the hollow handle tubes 231.

Figure 6:
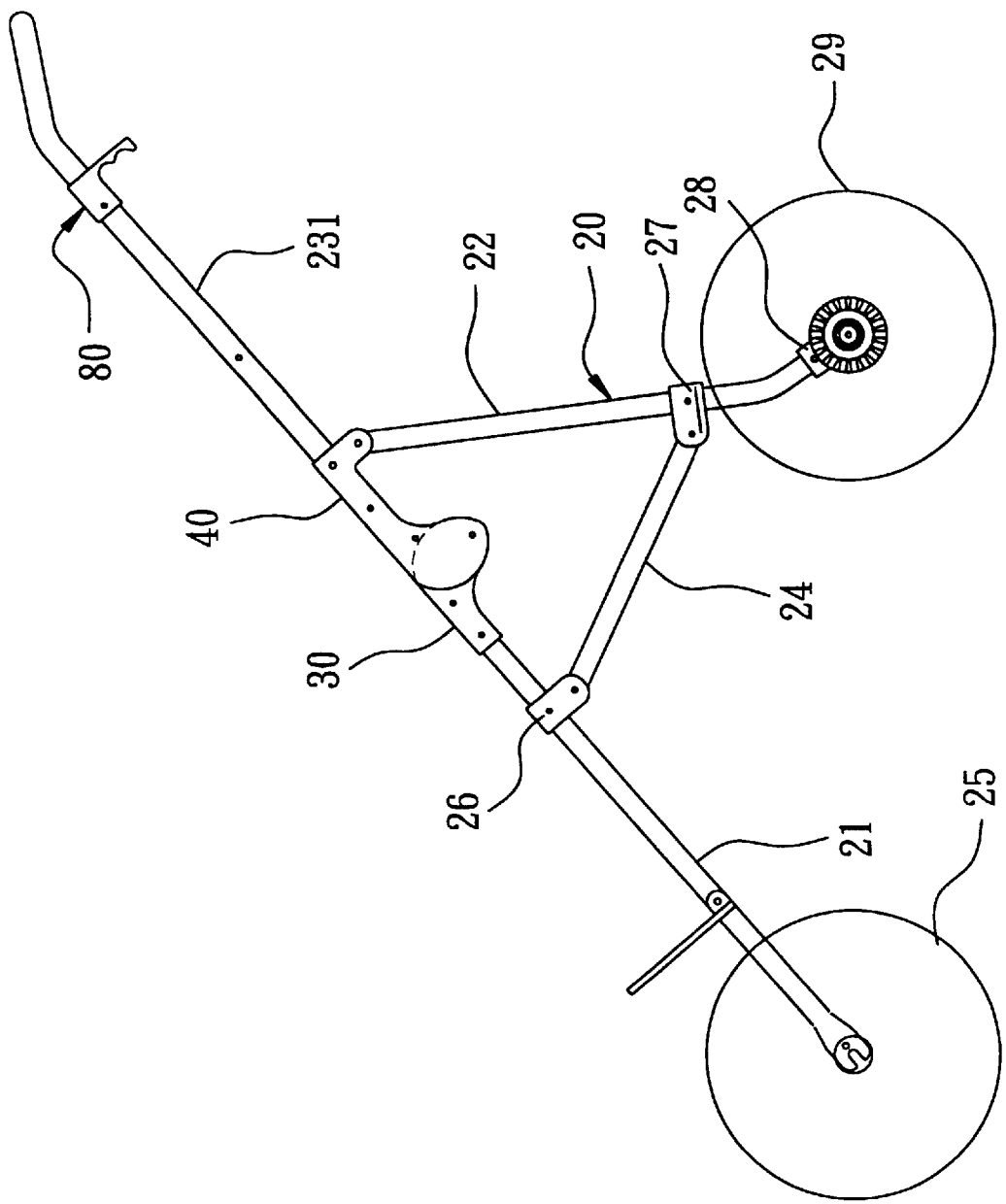
FIG. 6 is a schematic side view of the foldable stroller of the preferred embodiment in an unfolded state.

Referring to FIGS. 4, 6 and 7, when the foldable stroller 20 of the present invention is in an unfolded state, the forward enlarged portion 44 of the lower tubular end 40 of the respective hollow handle tube 231 overlaps with the rearward enlarged portion 33 of the lower leg end 30 of the respective front leg 21, with the right and left swept lug portions 34 accommodated inside the accommodating space 442 defined between the right and left sweeping lug portions 443. At the same time, the distal and proximate hooking notches 65, 66 of the rear hooking portion 60 respectively engage the hooked pins 37, 36, and the front leg 21 and the rear legs 221 are extended and positioned by means of the bracing rods 24.

Figure 9:
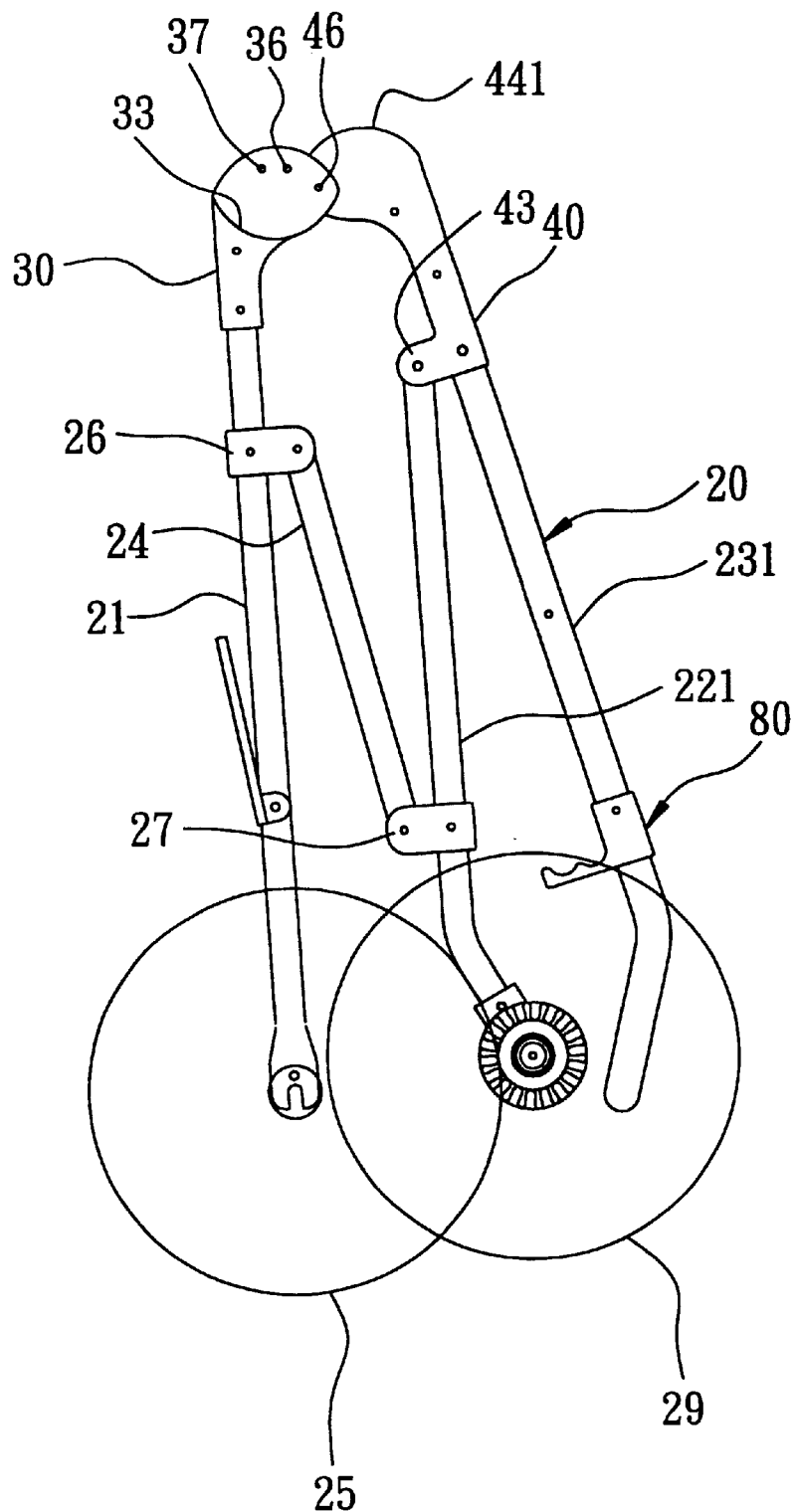
FIG. 9 is a schematic view of the foldable stroller of the preferred embodiment in a folded state.

Referring to FIG. 8, when it is desired to collapse the foldable stroller 20, the user only needs to hold the grip portions 82 of the actuating members 80 with his/her fingers and then exert a force to cause the grip portions 82 to displace upwardly. Since the respective grip portion 82 is connected to the actuated end 51 by means of the connecting key 83, which can displace along the key slot 232 in the upper tubular end 233, the actuated end 51 is brought to displace upwardly with the grip portion 82. The coupling end 52 also displaces synchronously along the elongated slot 521. At this time, since the locking element 62 is lockably disposed between the coupling end 52 and the rear hooking portion 60, an upward pulling force is generated with respect to the rear hooking portion 60. As the rear hooking portion 60 can pivotally turn about the pivot pin 64, it is brought to displace upwardly by the upward pulling force, so that the distal and proximate hooking notches 65, 66 thereof disengage from the hooked pins 37, 36, respectively. Thereafter, a force is exerted to push the hollow handle tubes 231 downwardly such that the hollow handle tubes 231 turn pivotally about the pivot pins 431 to bring the lower tubular ends 40 thereof to turn pivotally therewith. As a result, the lower tubular end 40s of the hollow handle tubes 231 tilt upwardly, and the hollow handle tubes 231 move closer to the rear legs 221. At the same time, the angle between the hollow handle tube 231 and the front leg 21 changes, and all of the front legs 21, the hollow handle tubes 231, the rear legs 221, and the bracing rods 24 are hence moved towards one another to a folded state, such as that shown in FIG. 9. As such, it can be appreciated that the foldable stroller 20 of the present invention is convenient to collapse. Besides, the overall length and profile of the foldable stroller 20 are reduced to facilitate storage and transport thereof.

Furthermore, when a force is applied via the grip portions 82 of the actuating members 80 to cause the plungers 50 to displace upwardly as a whole so that the rear hooking portion 60 of the respective locking member is pulled to turn pivotally and upwardly about the pivot pin 64, an end face 601 of the rear hooking portion 60 opposite to the hooking end thereof also displaces upwardly relative thereto. As a result, the distance between the locking element 53 and the rear hooking portion 60 is shortened, and the biasing member 70 therebetween is compressed. When the grip portions 82 of the actuating members 80 are released, due to the biasing action of the biasing members 70, the plungers 50, together with the rear hooking portions 60 of the locking members and the actuating members 80, will return to their original positions. As such, when it is desired to pull the hollow handle tubes 231 of the foldable stroller 20 upwardly, the grip portions 82 of the actuating members 80 are pulled to cause the rear hooking portions 60 of the locking members to turn pivotally and displace upwardly such that the forward enlarged portion 44 of the lower tubular end 40 and the rearward enlarged portion 33 of the upper leg end 30 overlap. Thereafter, the grip portions 82 are released so that the rear hooking portions 60 of the locking members return to their original positions by means of the biasing action of the biasing members 70 to cause the distal and proximate hooking notches 65, 66 to engage the hooked pins 37, 36, thereby positioning firmly the hollow handle tubes 231 and the front legs 21. Moreover, in operation, the distal hooking notch 65 is first caused to engage the pivot pin 36 to place the relevant components of the foldable stroller 20 in a first-stage locking state to prevent clamping the user's fingers. When the forward enlarged portion 44 and the rearward enlarged portion 33 overlap, the grip portions 82 are released to permit the distal and proximate hooking notches 65, 66 to respectively engage the pivot pins 37, 36 to strengthen the locking action. Hence, the foldable stroller 20 of the present invention is safe to use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A foldable stroller comprising:

a rear wheel axle with two lateral ends which are provided with two rear wheels;

a pair of rear legs disposed to be parallel to and spaced apart from each other in an axial direction that is parallel to said rear wheel axle, each of said rear legs having a lower anchored leg end mounted on a respective one of said lateral ends of said rear wheel axle, and an upper anchored leg end extending upwardly from said lower anchored leg end;

a pair of hollow handle tubes disposed to be parallel to and spaced apart from each other in the axial direction, each of said hollow handle tubes having a lower tubular end having a forward enlarged portion with a forward wall extending in the axial direction, and a right lateral wall joining said forward wall and facing the axial direction, an upper tubular end, and an intermediate tubular section disposed between said lower and upper tubular ends, and mounted pivotally to said upper anchored leg end of a respective one of said rear legs about the axial direction such that said upper tubular end is foldable downwardly and forwardly onto the respective one of said rear legs to place said hollow handle tubes in a first folded position, and is stretchable upwardly and rearwardly from the respective one of said rear legs to place said hollow handle tubes in a first stretched position;

a front leg frame including a front wheel rod which is provided with a front wheel, and a pair of front legs, each of said front legs having a lower leg end connected to said front wheel rod, an upper leg end which, when said front legs are in a second stretched position, extends upwardly, rearwardly and in a first transverse direction relative to the axial direction from said lower leg end, and which has a rearward enlarged portion with a rearward wall extending in the axial direction and confronting said forward wall of said lower tubular end of a respective one of said hollow handle tubes in the first transverse direction, and a right lateral section joining said rearward wall and facing the axial direction, said right lateral section being pivotally mounted to said right lateral wall of said lower tubular end of a respective one of said hollow handle tubes at a first pivot point about the axial direction such that when said hollow handle tubes are moved from the first folded position to the first stretched position, said right lateral wall moves from a first angular position where said right lateral wall overlaps slightly with said right lateral section, to a second angular position where said right lateral wall overlaps extensively with said right lateral section, and an intermediate leg section between said upper and lower leg ends;

a pair of bracing rods, each having a rear end which is mounted pivotally to a respective one of said rear legs and proximate to said lower anchored leg end about the axial direction, and a front end which is mounted pivotally to said intermediate leg section of a respective one of said front legs about the axial direction such that when said front legs are in a second folded position, said lower leg ends of said front legs will be turned about the axial direction and towards said bracing rods so as to be brought closer thereto for collapsing;

a pair of locking members, each including a front hooked portion disposed on said right lateral section of said upper leg end of a respective one of said front legs and extending in the axial direction, and a rear hooking portion having a hooking end and pivotally mounted on said right lateral wall of said lower tubular end of a respective one of said hollow handle tubes at a second pivot point about the axial direction such that when said right lateral wall is in the second angular position and said rear hooking portion is actuated to turn about the axial direction, said hooking end is brought to engage said front hooked portion;

a pair of plungers, each disposed in said intermediate tubular section and extending into said upper tubular end of a respective one of said hollow handle tubes, each of said plungers being movable in the first transverse direction, and having an actuated end and a coupling end opposite to each other in the first transverse direction, said coupling end being moved towards said forward enlarged portion so as to push said rear hooking portion of a respective one of said locking members to turn about the axial direction;

a pair of actuating members, each disposed on and movable relative to said upper tubular end of a respective one of said hollow handle tubes in the first transverse direction so as to actuate said actuated end of a respective one of said plungers; and a pair of biasing members, each biasing said coupling end of a respective one of said plungers to move in the first transverse direction and towards said upper tubular end of the respective one of said hollow handle tubes.

2. A foldable stroller according to claim 1, wherein:

said forward enlarged portion of said lower tubular end of each of said hollow handle tubes has a left lateral wall opposite to said right lateral wall in the axial direction, said right and left lateral walls forming right and left sweeping lug portions spaced apart from each other in the axial direction to define an accommodating space which extends in the first transverse direction to be communicated with said forward wall of said forward enlarged portion; and said rearward enlarged portion of said upper leg end has a left lateral section opposite to said right lateral section in the axial direction, said right and left lateral sections forming right and left swept lug portions spaced apart from each other in the axial direction and disposed inboard to said right and left sweeping lug portions, respectively, when said right and left sweeping lug portions are in the second angular position.

3. A foldable stroller according to claim 2, wherein:

said hooking end of said rear hooking portion of each of said locking members has proximate and distal hooking notches disposed relative to said second pivot point; and said front hooked portion of each of said locking members includes a pair of hooked pins respectively extending in the axial direction and secured to and disposed between said right and left swept lug portions respectively such that when said right and left sweeping lug portions are in the second angular position, said proximate and distal hooking notches engage said hooked pins, respectively.

4. A foldable stroller according to claim 3, wherein said distal hooking notch is disposed to sequentially engage said hooked pins when said rear hooking portion is pushed by said coupling end of a respective one of said plungers.

5. A foldable stroller according to claim 1, wherein said biasing members are coil springs, each sleeved on a respective one of said plungers and disposed proximate to said coupling end.

6. A foldable stroller according to claim 1, wherein:

said upper tubular end of each of said hollow handle tubes has a key slot extending in the first transverse direction; and each of said actuating members is tubular-shaped and is sleeved on said upper tubular end of the respective one of said hollow handle tubes, each of said actuating members including a connecting key disposed to extend in the axial direction and through said key slot to interconnect said actuating member and said actuated end of the respective one of said plungers so as to transmit movement of said actuating member relative to said upper tubular end to said actuated end.

7. A foldable stroller according to claim 1, further comprising a handle bar having two ends opposite to each other in the axial direction and respectively connected to said upper tubular ends of said hollow handle tubes.

* * * * *